United States Patent [19]

Herrmann et al.

[11] 4,374,395
[45] Feb. 15, 1983

[54] VIDEO SYSTEM WITH PICTURE INFORMATION AND LOGIC SIGNAL MULTIPLEXING

[75] Inventors: Carlo L. Herrmann; Granville E. Ott, both of Lubbock, Tex.

[73] Assignee: Texas Instruments Incorporated, Dallas, Tex.

[21] Appl. No.: 219,806

[22] Filed: Dec. 24, 1980

[51] Int. Cl.³ .......................................... H04N 9/535
[52] U.S. Cl. ........................................ 358/22; 358/183
[58] Field of Search ................................ 358/22, 183

[56] References Cited
U.S. PATENT DOCUMENTS 3,764,732 10/1973 Macheboeuf ............... 358/22
4,155,095 5/1979 Kirschner .................. 358/22
4,292,649 9/1981 Macheboeuf ............... 358/22

Primary Examiner—Richard Murray
Attorney, Agent, or Firm—Melvin Sharp; Leo N. Heiting; Robert D. Marshall, Jr.

[57] ABSTRACT

A color video signal generator includes means for selectively generating either color difference information or logic levels from the same output pins. The color video signal generator is employed in a video system which outputs either the internally generated video signal or an externally generated video signal depending on whether the color difference information or the logic levels are generated. This invention has application to video terminals and small computing systems which employ video displays to enable selective display of internally generated pictures or externally generated pictures or selective overlap of such pictures. This invention also has application to integrated circuit pin minimization by enabling an analog and a digital signal to be multiplexed on the same pin.

14 Claims, 3 Drawing Figures

VIDEO SYSTEM WITH PICTURE INFORMATION AND LOGIC SIGNAL MULTIPLEXING

SUMMARY OF THE INVENTION

The field of this invention is video systems in particular video display terminals and small computer systems which employ video display terminals which are constructed to permit switching between an internally generated video signal and an externally generated video signal.

In a first aspect of the present invention a video generator circuit generates a luminance signal and a pair of color different signals which may become logic levels upon reception of an external video override signal. The luminance signal includes a sync portion having a first voltage during a first portion of a repetitive video line interval. The luminance signal also includes brightness information falling within a range between a second voltage and a third voltage, this range not including the first voltage, during a second portion of the repetitive video line interval. The color difference signals each include color information during the second portion of the repetitive video line interval having a voltage in the range between the second voltage and the third voltage. Upon receipt of the external video override signal, each of the color different signals is switched to the first voltage, thereby yielding a logic level output.

According to a second aspect of the present invention a video generator/encoder circuit enables selective switching between an internally generated video signal and an externally generated video signal. A video generator such as described above in relation to the first aspect of this invention generates at least one signal having picture information multiplexed with logic levels. A sensor is responsive to this multiplexed signal and determines when the logic level is output. This sensor drives a video signal switcher which selects the internally generated video signal when picture information is received and which selects the externally generated video signal when the logic level is received. According to a first described embodiment, the video generator generates luminance and a pair of color difference signals which are switched with an externally generated signal of the same type having a luminance signal and a pair of color difference signals. According to a second described embodiment, the internally generated luminance signal and two color difference signals are encoded into a composite video signal and this internally generated composite video signal is switched with an externally generated composite video signal.

According to a third aspect of the present invention an analog signal and a digital signal may be multiplexed upon the same line in the manner in which the logic level and the picture information are multiplexed in the video generator described above.

BRIEF DESCRIPTION OF THE DRAWINGS

The above-described aspects of the invention together with other aspects of the invention will become clear to those skilled in the art from the following description taken in conjunction with the drawings.

DETAILED DESCRIPTION OF THE PREFERRED EMBODIMENTS

Figure 1:
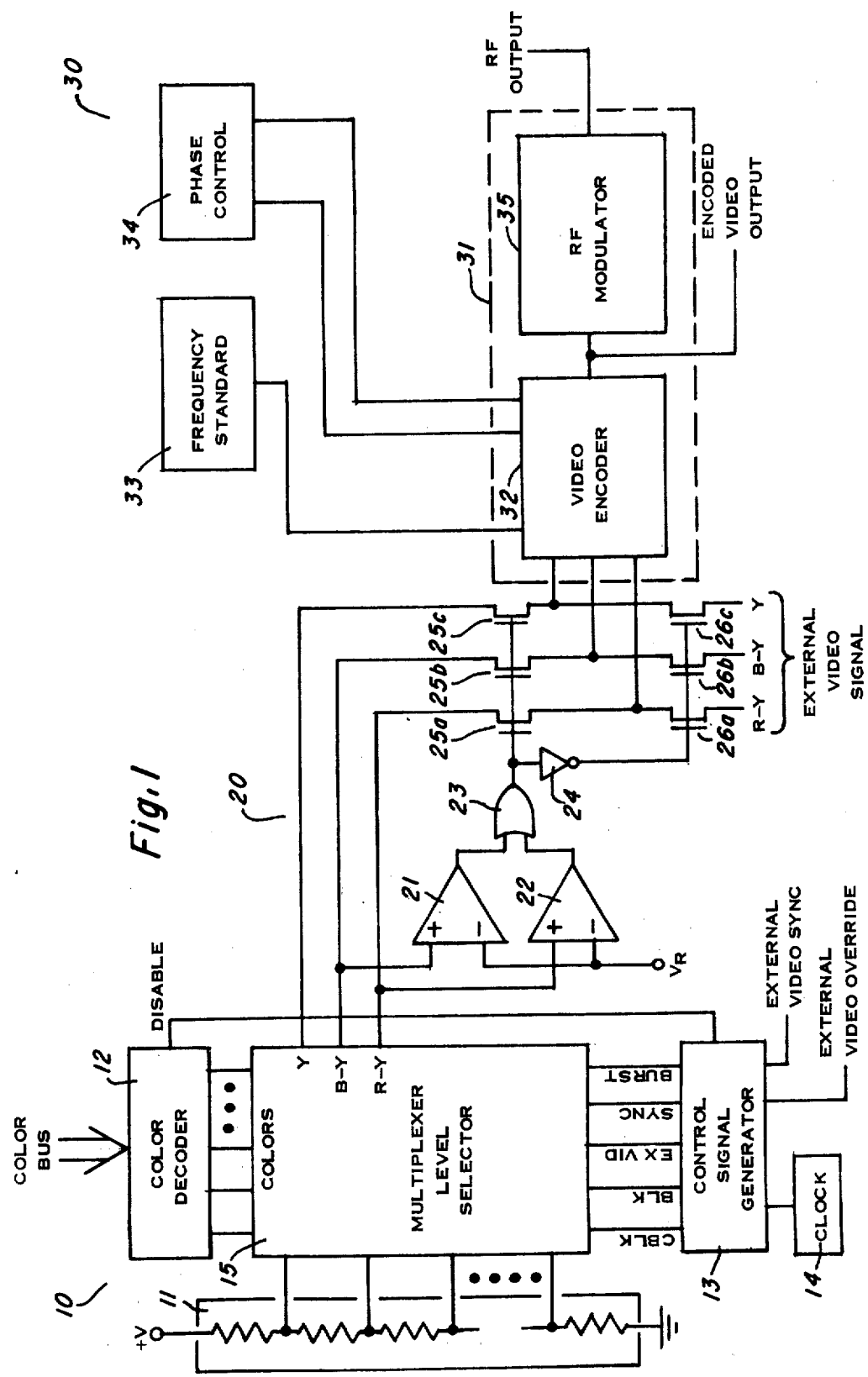
FIG. 1 illustrates a video system according to the present invention having multiplexed picture information and logic levels for external video mode switching.

FIG. 1 illustrates one embodiment of a video system constructed in accordance with the present invention. This video system includes video generator 10, video switching circuit 20 and encoder system 30.

Video generator 10 includes a resistor ladder voltage divider 11, a color decoder 12, a control signal generator 13, a clock 14 and a multiplexer/level selector 15. Resistor ladder voltage divider 11 has one end connected to a voltage source $+V$ and the other end grounded. A plurality of nodes of this resistor ladder voltage divider 11 are connected to multiplexer/level selector 15, thereby providing a plurality of voltages. Color decoder 12 receives a multibit signal on a color bus, this multibit signal being indicative of a particular color to be displayed. The color decoder 12 interpretes the information received on the color bus and actuates one of a plurality of color lines applied to multiplexer/level selector 15. Control signal generator 13 is responsive to signals from clock 14 to generate a plurality of control signals including a color blank signal (CBLK), a blank signal (BLK), an external video mode signal (EX VID), a synchronization signal (SYNC) and a color burst signal (BURST). Control signal generator 13 also generates a DISABLE signal which inhibits the operation of color decoder 12 for all times not included within a picture information interval. The reason for this provision is more fully described below. Control signal generator 13 is responsive to an external video sync signal and an external video override signal in a manner which will be more fully explained below.

Multiplexer/level selector 15 receives the plurality of voltages from the resistor ladder voltage divider 11, the individual color signals from color decoder 12 and the control signals from control signal generator 13. The multiplexer level/selector then generates three output signals, a luminance signal (Y), a blue color difference signal (B-Y) and a red color difference signal (R-Y). In general the multiplexer/level selector selectively couples one of the voltages supplied from resistor ladder voltage divider 11 to each of its outputs in accordance with the particular signals applied to it. Typically, the luminance signal includes a first portion at the beginning of each video line which has a specific voltage level recognized as a synchronization pulse. This particular voltage level is generated on the luminance signal output when it receives a SYNC input from color signal generator 13. During a second portion of each video line interval of the luminance signal, multiplexer/level selector 15 selects a voltage indicative of the particular picture brightness at the corresponding portion of the present video line. This brightness signal has a voltage within a preselected range, this preselected range not including the voltage of the sync portion of the luminance signal. Control signal generator 13 applies a SYNC signal to multiplexer/level selector 15 causing generation of the sync portion of the luminance signal during the reception of this SYNC signal. The brightness information during the other portion of the repetitive video line interval is determined by which of the preset colors coming from color decoder 12 is selected. Lastly, control signal generator 13 sends a BLK signal to multiplexer/level selector 15 during all those times of the repetitive line interval not included within the sync portion or the brightness information portion. This BLK signal causes multiplexer/level selector 15 to choose a voltage on the luminance signal line indicating zero luminance.

The blue and red color difference signals are generated in a similar manner. In accordance with the particular predetermined color signal received from color decoder 12, multiplexer/level selector 15 selects a predetermined voltage from resistor ladder voltage divider 11 for application to the red and blue color difference signal outputs. These voltages fall within the same range of voltages as the brightness information appearing in the luminance signal and these voltages are further generated during the same portion of the repetitive video line interval as the brightness information of the luminance signal. During a predetermined portion of each repetitive video line interval control signal generator 13 generates a BURST signal. Upon receipt of this BURST signal multiplexer/level selector 15 generates predetermined voltages on the red and blue color difference outputs which correspond to predetermined color burst signals employed in decoding and displaying the color video signal. During that portion of the repetitive video line interval not included in either the picture information portion or the color burst portion, control signal generator 13 generates a CBLK signal. Upon receipt of this CBLK signal multiplexer/level selector 15 selects an appropriate voltage indicative of a neutral color signal from the voltages supplied from resistor ladder voltage divider 11 and applies this voltage to both color difference signal outputs.

Control signal generator 13 receives a timing signal from clock 14 in order to enable it to generate the CBLK, BLK, SYNC, and BURST signals during the appropriate portion of the repetitive video line interval. Control signal generator 13 may be constructed in a well-known manner including a counter driven by the timing signal from clock 14 and decoders responsive to the count stored in the counter for causing the generation of the appropriate signals at the approprate time. Control signal generator 13 is responsive to an external video sync signal for setting the timing of control signal generator 13 in synchronization with the timing of the external video signal. This may be most advantageously accomplished by resetting the counter in control signal generator 13 when this external video sync signal is received.

Video generator 10 is responsive to an external video override signal for generating specific signals at the color difference signal outputs. The external video override signal is applied to control signal generator 13 which then applies an EX VID signal to multiplexer/level selector 15. Upon receipt of this EX VID signal, multiplexer/level selector 15 causes both color difference outputs to go to the same voltage as the sync level of the luminance signal. That is, it causes the color difference signal outputs to deviate from the predetermined range for color indication and take a specific value outside this range. As described in further detail below, this external video mode output in the color difference signals is employed for signaling external video switching.

Video switching circuit 20 is responsive to video information from the video generator in the form of the luminance signal and the two color difference signals and is further responsive to similar signals from an external video source. The blue color difference signal is applied to a non-inverting input of comparitor 21. The red difference signal is applied to the non-inverting input of comparitor 22. The inverting input of each of these comparitors is applied to a reference voltage $V_R$. The reference voltage $V_R$ must be selected to be outside the range of voltages of the picture information of the color difference signals and between this range and the voltage of the SYNC signal. As illustrated in greater detail in FIG. 2, the embodiment of FIG. 1 has the range of picture information voltages above the sync level and the external video mode signal level voltage. During the time that color difference signals are within the picture information voltage range both comparitors 21 and 22 generate logical high level signals. These logical high level signals are applied to OR gate 23 which produces an output of a logical high level. This logical high level is applied to the gates of transistors 25a, 25b and 25c. Transistors 25a, 25b and 25c are thus enabled and the luminance and color difference signal outputs of the video generator circuit 10 are applied to the encoder system 30. At the same time inverter 24 causes a logical low signal to be applied to the gates of transistors 26a, 26b and 26c. This disables these transistors and prevents passage of the external video signal to the encoder system. When either the red or the blue color difference signals fall below the reference voltage $V_R$, such as would be the case when the color difference signal outputs have the external video mode signal level, then both comparitors 21 and 22 generate logical low outputs. This causes the output of OR gate 23 also to be a logical low output. This logical low output is applied to the gates of transistors 25a, 25b and 25c thereby disabling these transistors and preventing application of the luminance and color difference signals generated by video generator circuit 10 to the encoder system 30. At the same time invertor 24 generates a logical high signal from the logical low output of OR gate 23. This logical high signal is applied to the gates of transistors 26a, 26b and 26c thereby enabling these transistors. Thus the luminance and color difference signals which form a part of the external video signal are applied to encoder system 30.

It will be readily understood by those skilled in the art that it is not required to employ logic levels in both color difference signals but that generation of a logic level in a single one of the outputs of multiplexer/level selector 15 is adequate for signaling purposes. The particular embodiment illustrated in FIGS. 1 and 3 uses logic levels in the two color difference signals to provide noise immunity in the video switching circuit 20 by insuring that the system does not switch to the external video signal unless both the color difference signals are at the logic level.

Encoder system 30 includes a combined video encoder and RF modulator 31 having video encoder 32 and RF modulator 35, and further includes frequency standard 33 and phase control 34. Combined video encoder and RF modulator 31 may be National Semiconductor part No. 1889. National Semiconductor part No. 1889 is capable of generating encoded video output signal encoded in either the NTSC standard or the PAL standard by proper selection of frequency standard 33 and phase control 34. In the NTSC encoding system the frequency standard is approximately 3.58 MHz. In the NTSC encoding system the phase of the color information in each video line is the same and therefore phase control 34 simply feeds back the signal received from video encoder 32 the same phase. In the PAL encoding system the frequency standard is approximately 4.43 MHz. In the PAL encoding system the phase of the color information alternates for alternating video lines. Thus for the PAL encoding system phase control 34 must have a bistable device which feeds back the signal from video encoder 32 in one phase for a single video line and in the opposite phase for the next video line. The encoded video output signal of video encoder 32 may be employed directly in a color monitor which will generate a display according to these signals or may be applied to an RF modulator 35. RF modulator 35 generates a standard television signal for application to an appropriate television receiver which may then serve as a video display.

Figure 2:
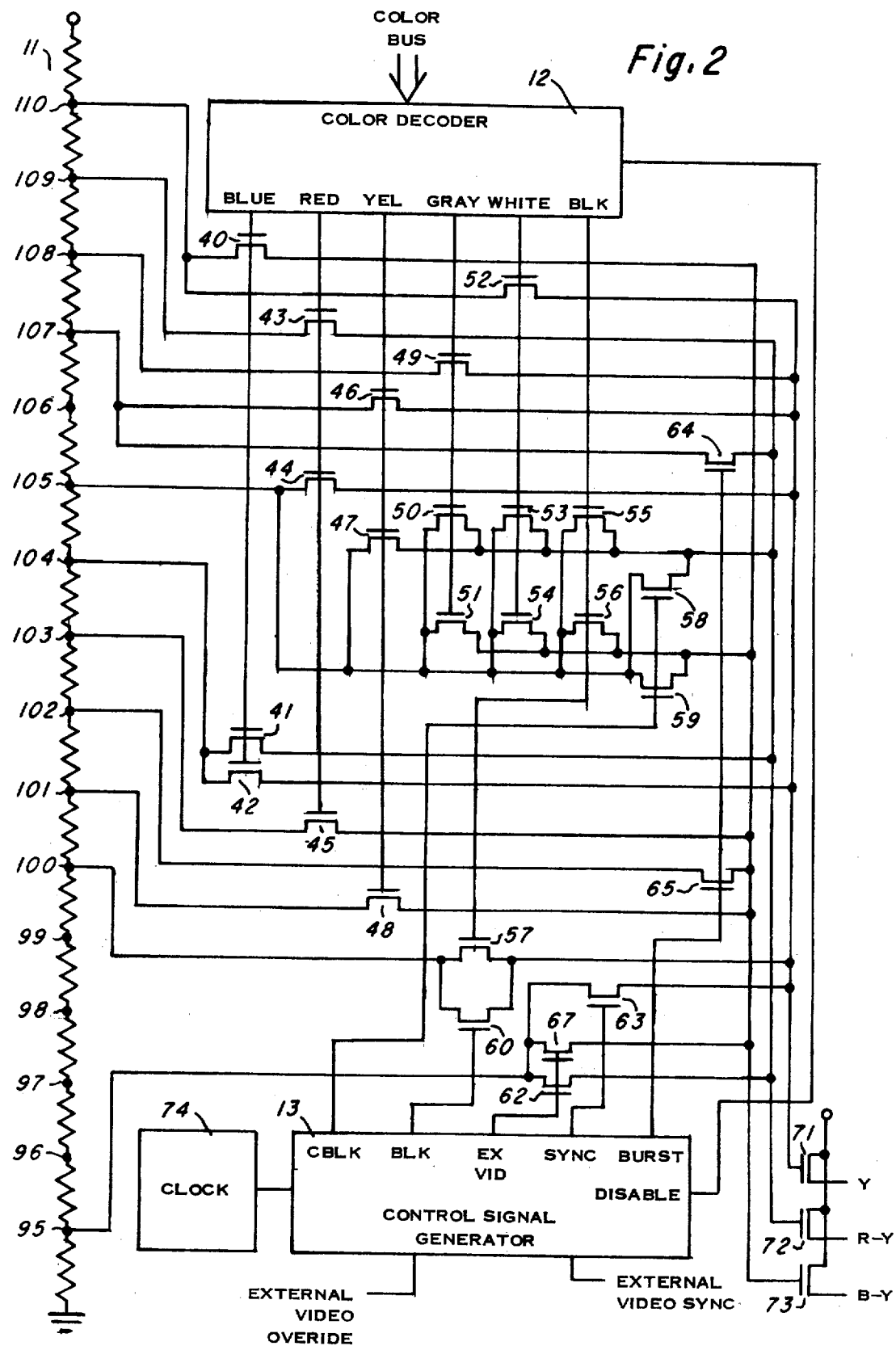
FIG. 2 illustrates the details of the multiplexer/level selector illustrated in FIG. 1.

FIG. 2 illustrates the details of the multiplexer/level selector 15 of the video generator circuit. Note that resistor ladder voltage divider 11 is illustrated in FIG. 2 as composing a plurality of resistors having a plurality of nodes 95 through 110. Multiplexer/level selector 15 operates by selectively coupling the nodes of resistor ladder voltage divider 11 to the gates of the respective output transistors 71, 72 and 73. In general, application of one of the predetermined color signals from color decoder 12 connects a predetermined node of resistor ladder voltage divider 11 to each of the output transistors 71, 72 and 73. A signal from control signal generator 13 also selectively couples nodes of resistor ladder voltage divider 11 to the output transistors, however, these control signals will couple voltages to some but not all of the gates of output transistors 71, 72 and 73. When color decoder 12 generates a signal on the blue output, transistors 40, 41 and 42 are enabled by application of this signal to their gates. Transistor 40 couples node 110 to the gate of the blue color difference output transistor 73. Transistor 41 couples node 104 to the gate of red color difference output transistor 72. Lastly, transitor 42 couples node 104 to the gate of luminance output transistor 71. Thus generation of the blue signal from color decoder 12 generates a predetermined voltage on the luminance and color difference signal outputs. When color decoder 12 generates a signal on the red color line, transistor 43 couples node 109 to the gate of transistor 72, transistor 44 couples node 105 to the gate of transistor 71 and transistor 45 couples node 103 to the gate of transistor 73. This is interpreted as a red video signal. When color decoder 12 generates a yellow color signal, transistor 46 couples node 107 to transistor 71, transistor 47 couples node 105 to the transistor 72 and transistor 48 couples node 101 to transistor 73. This is interpreted as a yellow color signal. When color decoder 12 generates a gray signal, transitor 49 couples node 108 to transistor 71, transistor 50 couples node 105 to transistor 72 and transistor 51 couples node 105 to transistor 73. Note that node 105 is approximately midway in voltage between the range from node 110 to node 100. This voltage level is interpreted as neutral color signal and is employed in the gray, white, black and color blank signals as an indication of a non-chromatic color. When color decoder 12 generates a white signal, transistor 52 couples node 110 to transistor 71 and node 105 is coupled to transistor 72 and 73 via transistors 53 and 54, respectively. Note that the only difference between the gray signal and the white signal is that the white signal has a greater luminance value than the gray signal. When color decoder generates a black signal, transistors 55 and 56 couple node 105 to transistors 72 and 73, respectively. In addition, transistor 57 couples node 100 to the transistor 71. This signal is the same as the gray and the white signals described above except for the luminance signal which is at the minimum of the luminance signal range.

When control signal generator 13 generates the CBLK, transistor 58 and 59 couple node 105 to transistors 72 and 73, respectively. In this manner a neutral color signal is applied to each of the color difference signal lines. When control signal generator 13 generates a BLK signal, transistor 60 couples node 100 to transistor 71. Thus the luminance signal has the same value as the black signal during the blanking time. When control signal generator 13 generates an EX VID video signal, transistor 61 couples node 95 to transistor 73 and transistor 62 couples node 95 to transistor 72. Thus an external video mode signal is generated in the color difference signals by outputting the voltage at node 95 which is outside the range of the ordinary color difference signals and lower in voltage than this range. When control signal generator 13 generates a SYNC signal, transistor 63 couples node 95 to transistor 71. Thus the sync portion of the luminance signal output has the same voltage as the external video mode signal of the color difference signal outputs. When control signal generator 13 generates a BURST signal, transistor 64 couples node 107 to transistor 72 and transistor 65 couples node 102 to transistor 73. This causes generation of a particular predetermined color on the color difference signal outputs during this color burst interval. This predetermined color is used in the receiver as a standard or reference signal for decoding the received color encoded signals.

One skilled in the art would clearly understand that the particular color signals from color decoder 12 used in the circuit illustrated in FIG. 2 are not exhaustive. That is, a color decoder 12 could be constructed for actuation of a greater number of predetermined color signals. All that is necessary is to arrange that the particular output of color decoder 12 energizes transistors for coupling the appropriate voltages from resistor ladder voltage divider 11 to the appropriate output transistors 71, 72 and 73.

Control signal generator 13 generates a DISABLE signal to the color decoder 12. This DISABLE prevents generation of any signals by color decoder 12 except during a picture information portion of the video line interval. This prevents simultaneous actuation of some transistors by color decoder 12 and control signal generator 13 thereby avoiding short circuits between nodes of resistor ladder voltage divider 11.

Figure 3:
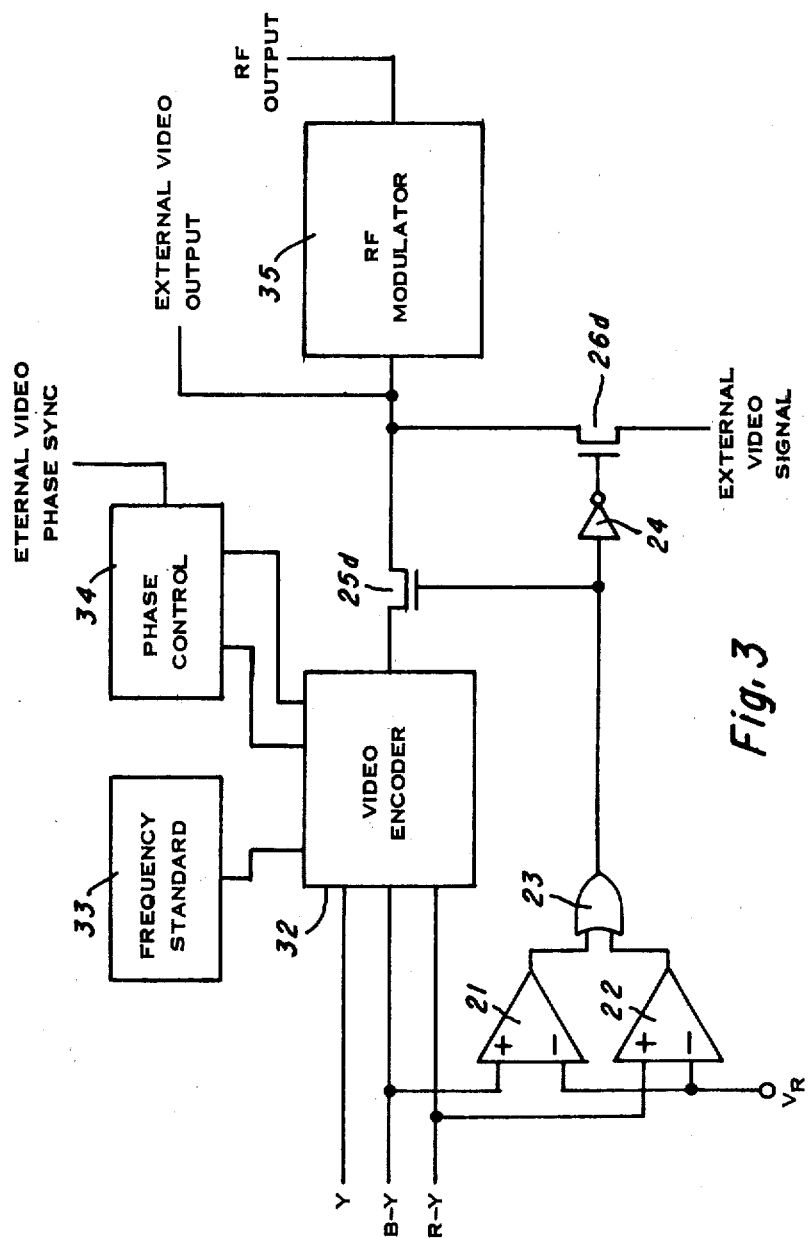
FIG. 3 illustrates an alternative embodiment of the video switching circuit and the encoder system illustrated in FIG. 1.

FIG. 3 illustrates an alternate embodiment of the video switching circuit and the encoder system illustrated in FIG. 1. In the case of the embodiment illustrated in FIG. 3, the external video signal is received in an encoded format. The blue and red color difference signals are applied to the non-inverting input of comparitors 21 and 22, respectively, in the same manner as illustrated in FIG. 1. The outputs of comparitors 21 and 22 are applied to OR gate 23, also in the same manner as illustrated in FIG. 1. Thus OR gate 23 generates a logical high input signal when either color difference signal is within the predetermined picture information range and generates a logical low signal when both of the color difference signals are below the voltage of the voltage reference $V_R$. Contrary to the embodiment illustrated in FIG. 1, only the color difference signals from video generator are applied to video encoder 32. The received luminance and color difference signals are encoded by video encoder 32 in the same manner as previously described in conjunction with FIG. 1, thus producing an encoded video output signal corresponding to the signals from video generator 10. Note that phase control 34 is illustrated as being responsive to an external video phase sync signal. This external video phase sync signal is only employed when the video encoder 32 operates according to the PAL encoding system. In such a case, because the color signals have alternate phases on alternate video lines, it is necessary to synchronize the phase of the encoded internally generated video signal with the phase of the external video signal. This is necessary to insure proper decoding of the signals by the video display when switching between the internal and the external video signal. When either of the red and blue color difference signals is within the picture information range, a logical high signal is output from OR gate 23. This logical high signal is applied to the gate of transistor 25d, thereby enabling this transistor to couple the output of video encoder 32 to the input of RF modulator 35. At the same time, inverter 24 applies a logical low signal to the gate of transistor 26d, thereby disabling this transistor and preventing passage of the external video signal. When both of the color difference signal outputs falls below the reference voltage $V_R$, such as the case when an external video mode signal is generated, OR gate 23 generates a logical low output. This logical low output disables transistor 25d and prevents passage of the internal video output. At the same time, inverter 24 applies a logical high signal to the gate of transistor 26d, thereby enabling passage of the external video signal. As illustrated in FIG. 1, it is possible to employ the encoded video output directly, such as an application in which this is applied to a color monitor, or to modulate this signal on a RF carrier via RF modulator 35 for application to an ordinary television receiver employed as a video display.

Although the present invention has been described in conjunction with a number of preferred embodiments, it is understood that one skilled in the art would recognize that numerous other embodiments employing different design choices or different arrangement of parts may be constructed without departing from the spirit and the scope of the present invention.

What is claimed is:

1. A luminance signal generator having a first output terminal, for generating at said first output terminal a line synchronization signal having a predetermined fixed first voltage during a first predetermined period of a repetitive video line interval and for generating at said first output terminal a brightness signal having a voltage in the range between a second voltage and a third voltage during a second predetermined period of said repetitive video line interval, said range between said second voltage and said third voltage extending to the limits of said brightness signal voltages and not including said first voltage; and two color difference signal generators, each having a second output terminal and each responsive to an external video override signal, each for generating at said second output terminal a color difference signal having a voltage in said range between said second voltage and said third voltage during said second predetermined period, said range between said second voltage and said third voltage extending to the limits of said color difference signal voltages, and each for generating at said second output terminal an external video enable signal having said first voltage when said external video override signal is received.

2. The color video signal generator as claimed in claim 1, wherein:

each of said color difference signal generators further includes means for generating respective color burst indicating signals during a third predetermined period of said repetitive video line internal, each of said respective color burst indicating signals having a predetermined voltage on said range between said second voltage and said third voltage.

3. The color video signal generator as claimed in claim 2, wherein:

said luminance signal generator further includes means for generating a brightness blanking signal during a fourth predetermined period of said repetitive video line interval not included within either said first or second predetermined period of said repetitive video line internal, said brightness blanking signal having a fourth voltage; and each of said color difference signal generators further includes means for generating a color blanking signal during a fifth predetermined period of said repetitive video line interval not included within either said second or third predetermined period of said repetitive video line interval, each of said color blanking signals having a fifth voltage.

4. The color video signal generator as claimed in claim 3, wherein:

said fourth voltage is between said first voltage and said range between said second voltage and said third voltage.

5. The color video signal generator claimed in claim 3, further comprising:

a video state code receiver for receiving a video state code, said video state code being indicative of one of a plurality of predetermined video states, each of said video states having a predetermined brightness level and two respective predetermined color difference levels associated therewith, and for determining said predetermined brightness level and said predetermined color difference levels; and wherein said luminance signal generator being responsive to said video state code receiver during said second predetermined period of said repetitive video line interval, for generating said brightness signal in a manner indicative of said detected predetermined brightness level; and each of said color difference signal generators being responsive to said video state code receiver during said second predetermined period of said repetitive video line interval, for generating said color difference signals in a manner indicative of a corresponding one of said detected predetermined brightness levels.

6. The color video generator system as claimed in claim 3, further comprising:

a voltage generator circuit for generating a plurality of voltages including at least said first voltage, said fourth voltage, said fifth voltage and a plurality of voltages in said range between said second voltage and said third voltage;

said luminance signal generator being responsive to said voltage generator circuit, having a first selective switching means, said first selective switching means for coupling said first voltage to said first output terminal during said first predetermined period of said repetitive video line interval, for coupling selected ones of said plurality of voltages in said range between said second voltage and said third voltage to said first output terminal during said second predetermined period of said repetitive video line interval and for coupling said fourth voltage to said first output terminal during said fourth predetermined period of said repetitive line interval;

each of said color difference signal generators being responsive to said voltage generator circuit, each having a second selective switching means, each of said second selective switching means for coupling selected ones of said plurality of voltages in said range between said second voltage and said third voltage to said second output terminal during said second predetermined period of said repetitive video line interval, for coupling a predetermined one of said plurality of voltages in said range between said second voltage and said third voltage to said second output terminal during said third predetermined period of said repetitive video line interval, and for coupling said fifth voltage to said second output terminal during said fifth predetermined period of said repetitive video line.

7. The color video generator system as claimed in claim 6, wherein:

said voltage generator circuit comprises a plurality of resistors connected in series across a voltage source, said plurality of voltages being generated at the junctions between said plurality of resistors.

8. A video generator system comprising:

a video generator, responsive to an external video override signal, for generating a plurality of signals indicative of picture information, each having a voltage in a range between a first voltage and a second voltage, said range between said first voltage and said second voltage extending to the limits of said picture information signals, at least one of said signals being indicative of synchronization information having a predetermined fixed third voltage outside said range between said first voltage and said second voltage during a predetermined repetitive portion thereof and at least one of said signals being indicative of an external video mode having said third voltage when said external video override signal is received; and a video switching means responsive to said video generator and to a plurality of external video signals indicative of synchronization information and picture information, for outputting said plurality of signals from said video generator when said external video mode indicative signal has a voltage in said range between said first voltage and said second voltage and for outputting said plurality of external video signals when said external video mode indicative signal has said third voltage.

9. The video generator system claimed in claim 8, further comprising:

an RF modulator means for generating a radio frequency signal modulated by said plurality of signals output from said video switching means.

10. The video generator system claimed in claim 8, wherein:

said video generator includes means responsive to said plurality of external video signals for generating said synchronization information indicative signal corresponding to said synchronization information of said plurality of external video signals.

11. A video generator system comprising:

a video generator, responsive to an external video override signal, for generating a plurality of signals indicative of picture information, each having a voltage in a range between a first voltage and a second voltage, said range between said first voltage and said second voltage extending to the limits of said picture information signals, at least one of said signals being indicative of synchronization information having a predetermined fixed third voltage outside said range between said first voltage and said second voltage during a predetermined repetitive portion thereof and at least one of said signals being indicative of an external video mode having said third voltage when said external video override signal is received;

a video encoding means for encoding said plurality of signals indicative of picture information into a single internal composite video signal; and a video switching means responsive to said external video mode indicative signal, said internal composite video signal and an external composite video signal encoded in the same format as said internal composite video signal, for outputting said internal composite video signal when said external video mode indicative signal has a voltage in said range between said first voltage and said second voltage and for outputting said external composite video signal when said external video mode indicative signal has said third voltage.

12. The video generator system claimed in claim 11, further comprising:

an RF modulator means for generating a radio frequency signal modulated by said signal output from said video switching means.

13. The video generator system claimed in claim 11, further comprising:

means responsive to said external composite video signal for extracting synchronization information therefrom; and said video generator includes means responsive to said extracted synchronization information for generating said synchronization information indicative signal corresponding to said extracted synchronization information.

14. An analog/digital signal multiplexer comprising:

an analog signal generator for generating an analog signal having a voltage in a range between a first voltage and a second voltage;

a digital signal generator for generating a digital signal having either a first state or a second state; and a signal switching means, responsive to said analog signal and said digital signal, having an output terminal, said digital signal has said first state and for switching a predetermined fixed third voltage not included within said range between said first voltage and said second voltage to said output terminal when said digital signal has said second state.

* * * * *